US012691332B2

(12) United States Patent
Kim et al.

(10) Patent No.: US 12,691,332 B2
(45) Date of Patent: Jul. 28, 2026

(54) ELECTRONIC APPARATUS AND CONTROLLING METHOD THEREOF

(71) Applicant: Samsung Electronics Co., Ltd., Gyeonggi-do (KR)

(72) Inventors: Hongyoon Kim, Suwon-si (KR); Kiljong Kim, Suwon-si (KR); Jongwon Kim, Suwon-si (KR); Seokwoo Song, Suwon-si (KR); Hyunkook Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 369 days.

(21) Appl. No.: 18/328,252

(22) Filed: Jun. 2, 2023

(65) Prior Publication Data

US 2023/0364465 A1 Nov. 16, 2023

Related U.S. Application Data

(63) Continuation of application No. PCT/KR2023/006288, filed on May 9, 2023.

(30) Foreign Application Priority Data

May 10, 2022 (KR) ........................ 10-2022-0057477

(51) Int. Cl.
*A63B 24/00* (2006.01)
*G06T 7/68* (2017.01)
(Continued)

(52) U.S. Cl.
CPC ............ *A63B 24/0003* (2013.01); *G06T 7/68* (2017.01); *G06T 7/70* (2017.01); *G06V 10/44* (2022.01);
(Continued)

(58) Field of Classification Search
CPC ......... A63B 24/0003; G06T 7/68; G06T 7/70; G06T 2207/20084; G06T 2207/30196;
(Continued)

(56) References Cited

U.S. PATENT DOCUMENTS

| 7,810,392 B2 | 10/2010 | Kitagawa |
| 2016/0042529 A1 | 2/2016 | Tao et al. |

(Continued)

FOREIGN PATENT DOCUMENTS

| EP | 3574828 | 11/2019 |
| KR | 100937204 B1 | 1/2010 |

(Continued)

OTHER PUBLICATIONS

Search Report and Written Opinion dated Aug. 25, 2023 issued in International Patent Application No. PCT/KR2023/006288.

(Continued)

*Primary Examiner* — Abhishek Sarma
(74) *Attorney, Agent, or Firm* — Nixon & Vanderhye, P.C.

(57) ABSTRACT

An electronic apparatus is disclosed. The electronic apparatus includes: a memory including at least one instruction, a processor coupled with the memory and configured to control the electronic apparatus, and the processor is configured, by executing the at least one instruction, to: obtain a moving image, identify a person and pose data of the person from a plurality of frames in the moving image, obtain exercise pattern information corresponding to the plurality of frames using pose data of the identified person, recognize an exercise motion of the identified person by inputting at least one frame of the moving image into at least one neural network model, and obtain exercise feature information corresponding to the recognized exercise motion, identify, based on the exercise feature information
(Continued)

and the exercise pattern information, a first frame interval and a second frame interval different from the first frame interval from among the plurality of frames in the moving image, and provide information on an exercise motion corresponding to the second frame interval by comparing the first frame interval with the second frame interval.

18 Claims, 13 Drawing Sheets

(51) Int. Cl.
| | | |
|---|---|---|
| *G06T 7/70* | (2017.01) | |
| *G06V 10/44* | (2022.01) | |
| *G06V 40/20* | (2022.01) | |

(52) U.S. Cl.
CPC .... *G06V 40/23* (2022.01); *G06T 2207/20084* (2013.01); *G06T 2207/30196* (2013.01); *G06V 2201/07* (2022.01)

(58) Field of Classification Search
CPC . G06T 7/20; G06T 7/246; G06T 2207/20081; G06T 2207/30232; G06T 2207/10016; G06V 10/44; G06V 40/23; G06V 2201/07; G06N 3/08; G06F 2218/10
See application file for complete search history.

(56) References Cited

U.S. PATENT DOCUMENTS

| | | |
|---|---|---|
| 2020/0051446 A1 | 2/2020 | Rubinstein et al. |
| 2020/0111384 A1 | 4/2020 | Bell et al. |
| 2021/0016150 A1 | 1/2021 | Jeong et al. |
| 2021/0289227 A1 | 9/2021 | Zhu et al. |
| 2022/0092300 A1 | 3/2022 | Eom |
| 2022/0138966 A1 | 5/2022 | Sung et al. |

FOREIGN PATENT DOCUMENTS

| | | |
|---|---|---|
| KR | 10-1826268 | 2/2018 |
| KR | 20180075197 A | 7/2018 |
| KR | 10-2031243 | 10/2019 |
| KR | 10-2020-0022788 | 3/2020 |
| KR | 10-2020-0025290 | 3/2020 |
| KR | 10-2020-0089934 | 7/2020 |
| KR | 20200129327 A | 11/2020 |
| KR | 20200133847 A | 12/2020 |
| KR | 10-2021-0128943 | 10/2021 |
| KR | 10-2022-0039440 | 3/2022 |

OTHER PUBLICATIONS

Extended European Search Report dated Jan. 29, 2025 issued in European Patent Application No. 23803816.0.

Briassouli Alexia et al., Estimation of Multiple Periodic Motions from Video, Online:https://www.researchgate.net/publication/221303954, May 2006, 14 pages, Research Gate.

ML, Calculate the motion similarity between two people, Online:[https://blog.solarmagic.dev/ml/2021/04/16/pose-similarity], Aug. 4, 2020, 33 pages with English Translation.

Cloud Vision API, Online: [https://cloud.google.com/vision?hl=ko], Retrieved Jul. 14, 2021, 7 pages, Google Data Cloud with English Translation.

Kim Hyeong-Gyun et al., Fitness Measurement system using deep learning-based pose recognition, Journal of Digital Convergence, 2020, pp. 97-103, vol. 18. No. 12.

FIG. 12

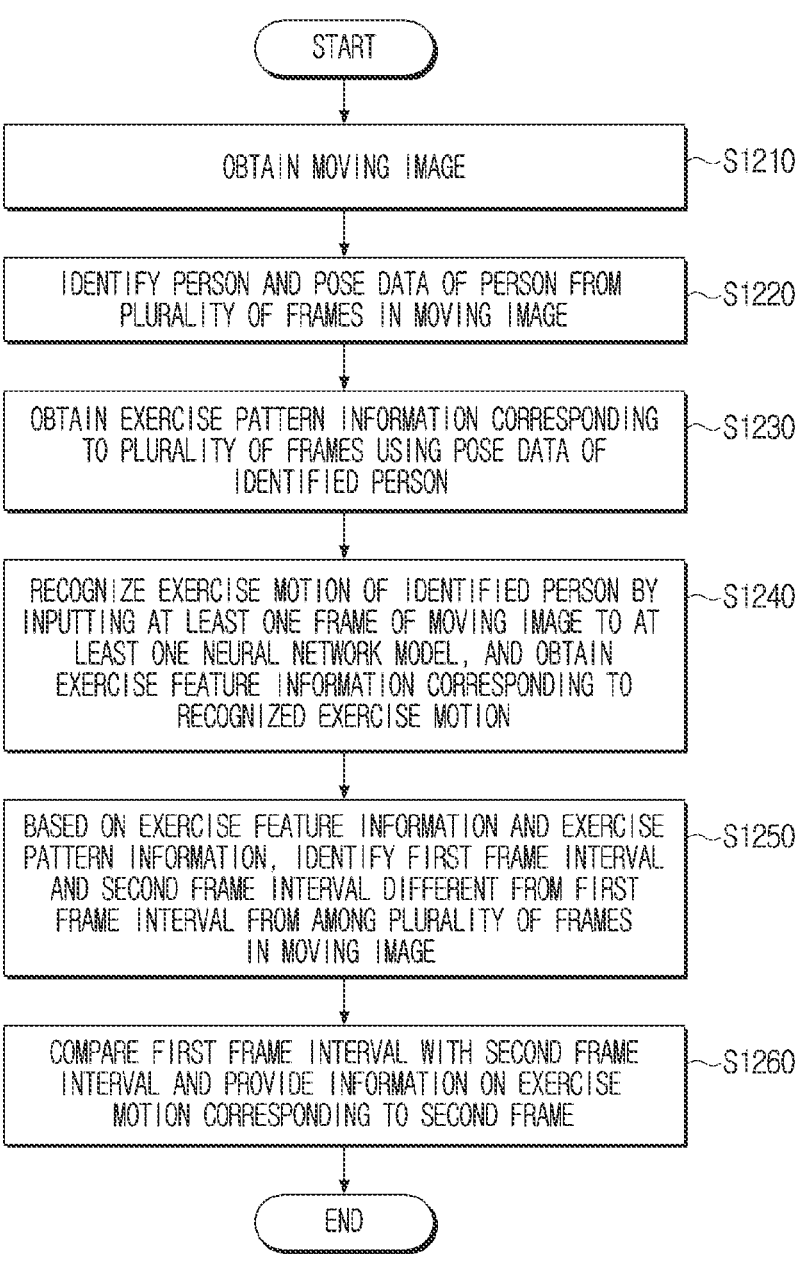

START

OBTAIN MOVING IMAGE ~S1210

IDENTIFY PERSON AND POSE DATA OF PERSON FROM PLURALITY OF FRAMES IN MOVING IMAGE ~S1220

OBTAIN EXERCISE PATTERN INFORMATION CORRESPONDING TO PLURALITY OF FRAMES USING POSE DATA OF IDENTIFIED PERSON ~S1230

RECOGNIZE EXERCISE MOTION OF IDENTIFIED PERSON BY INPUTTING AT LEAST ONE FRAME OF MOVING IMAGE TO AT LEAST ONE NEURAL NETWORK MODEL, AND OBTAIN EXERCISE FEATURE INFORMATION CORRESPONDING TO RECOGNIZED EXERCISE MOTION ~S1240

BASED ON EXERCISE FEATURE INFORMATION AND EXERCISE PATTERN INFORMATION, IDENTIFY FIRST FRAME INTERVAL AND SECOND FRAME INTERVAL DIFFERENT FROM FIRST FRAME INTERVAL FROM AMONG PLURALITY OF FRAMES IN MOVING IMAGE ~S1250

COMPARE FIRST FRAME INTERVAL WITH SECOND FRAME INTERVAL AND PROVIDE INFORMATION ON EXERCISE MOTION CORRESPONDING TO SECOND FRAME ~S1260

END

ELECTRONIC APPARATUS AND CONTROLLING METHOD THEREOF

CROSS-REFERENCE TO RELATED APPLICATIONS

This application is a continuation of International Application No. PCT/KR2023/006288 designating the United States, filed on May 9, 2023, in the Korean Intellectual Property Receiving Office and claiming priority to Korean Patent Application No. 10-2022-0057477, filed on May 10, 2022, in the Korean Intellectual Property Office, the disclosures of which are incorporated by reference herein in their entireties.

BACKGROUND

1. Field

The disclosure relates to an electronic apparatus and a controlling method thereof. For example, the disclosure relates to an electronic apparatus that provides information on an exercise motion by analyzing an exercise motion of a user and a controlling method thereof.

2. Description of Related Art

In related art, physical information corresponding to an exercise motion pose of a person had been obtained through pre-learning, and feedback for a current exercise motion had been provided based on the obtained physical information.

To obtain the physical information described above, in the related art, exercise motion pose corresponding to each of all exercise motions had to be pre-learned, and there has been a problem of excessive cost being spent in the pre-learning.

SUMMARY

The disclosure addresses at least the above-mentioned problems and/or disadvantages of related art and embodiments of the disclosure provide an electronic apparatus which provides information on an exercise motion of a person in real-time without pre-learning physical information of each exercise motion pose and a controlling method thereof.

Problems to be addressed by the disclosure are not limited to the above-mentioned problems and/or disadvantages, and other problems that are not mentioned herein may be clearly understood to those of ordinary skill in the art from the description below.

According to an example embodiment, an electronic apparatus includes: a memory including at least one instruction, and a processor coupled with the memory and configured to control the electronic apparatus, wherein the processor is configured, by executing the at least one instruction, to: obtain a moving image, identify a person and pose data of the person from a plurality of frames in the moving image, obtain exercise pattern information corresponding to the plurality of frames using pose data of the identified person, recognize an exercise motion of the identified person by inputting at least one frame of the moving image into at least one neural network model, obtain exercise feature information corresponding to the recognized exercise motion, identify, based on the exercise feature information and the exercise pattern information, a first frame interval and a second frame interval different from the first frame interval from among the plurality of frames in the moving image, and provide information on an exercise motion corresponding to the second frame interval by comparing the first frame interval with the second frame interval.

The processor may be configured to: input at least one frame of the moving image in a first neural network model configured to identify whether an exercise motion of a person is a symmetrical motion, and identify whether the exercise motion of the person is a symmetrical motion, and input at least one frame of the moving image in a second neural network model configured to identify whether an exercise motion of a person is a hold motion, and identify whether the exercise motion of the person is a hold motion.

The first neural network model may be configured to be trained based on a learning moving image which captured an exercise motion of a person and information on whether the exercise motion of the person corresponding to the learning moving image is a symmetrical motion, and the second neural network model may be configured to be trained based on a learning moving image which captured an exercise motion of a person and information on whether the exercise motion of the person corresponding to the learning moving image is a hold motion.

The processor may be configured to identify, based on an exercise motion of the person being a symmetrical motion and a hold motion, an interval from a start frame to a first time as the first frame interval from among the plurality of frames in the moving image.

The processor may be configured to: identify, based on an exercise motion of the person being a symmetrical motion and a non-hold motion, each exercise repetition interval from the plurality of frames in the moving image based on the exercise pattern information, and identify, based on the identified exercise repetition intervals, an interval from a start frame to a frame corresponding to an exercise repetition interval of a first number of times as the first frame interval from among the plurality of frames in the moving image.

The processor may be configured to: identify, based on an exercise motion of the person being a non-symmetrical motion and a hold motion exercise, a frame corresponding to an interval from a frame in which a first symmetrical exercise motion is first started to a second time and an interval from a frame in which a second symmetrical exercise motion is first started to a second time as the first frame interval from among the plurality of frames in the moving image based on the exercise pattern information.

The processor may be configured to: identify, based on an exercise motion of the person being a non-symmetrical motion and a non-hold motion, each frame corresponding to a first symmetrical exercise motion and a second symmetrical exercise motion from the plurality of frames in the moving image based on the exercise pattern information, and identify a frame corresponding to the first symmetrical exercise motion of a second number of times and a frame corresponding to the second symmetrical exercise motion of a second number of times from a start frame as the first frame interval from among the plurality of frames in the moving image.

The processor may be configured to identify, based on the moving image being played, a frame of a specified interval from the frame being played as the second frame.

The processor may be configured to: identify a physically depleted state based on a difference value of exercise pattern information corresponding to the first frame interval and exercise pattern information of the second frame interval being greater than or equal to a pre-set value, and provide, based on being identified as the physical depleted state, information on an exercise motion of the person corresponding to the second frame interval.

The processor may be configured to: obtain an original moving image, and obtain, based on an exercise data base (DB) stored with a plurality of moving images that include a plurality of exercise motions, the moving image by identifying a frame corresponding to an exercise motion of the person from among a plurality of frames included in the original moving image.

According to an example embodiment, a method of controlling an electronic apparatus includes: obtaining a moving image, identifying a person and pose data of the person from a plurality of frames in the moving image, obtaining exercise pattern information corresponding to the plurality of frames using pose data of the identified person, recognizing an exercise motion of the identified person by inputting at least one frame of the moving image into at least one neural network model, obtaining exercise feature information corresponding to the recognized exercise motion, identifying, based on the exercise feature information and the exercise pattern information, a first frame interval and a second frame interval different from the first frame interval from among the plurality of frames in the moving image, and providing information on an exercise motion corresponding to the second frame by comparing the first frame interval with the second frame interval.

The obtaining exercise feature information may include: inputting at least one frame of the moving image into a first neural network model to identify whether an exercise motion of a person is a symmetrical motion, and identifying whether an exercise motion of the person is a symmetrical motion, and inputting at least one frame of the moving image to a second neural network model to identify whether an exercise motion of a person is a hold motion, and identifying whether an exercise motion of the person is a hold motion.

The first neural network model may be trained based on a learning moving image which captured an exercise motion of a person and information on whether the exercise motion of the person corresponding to the learning moving image is a symmetrical motion, and the second neural network model may be trained based on a learning moving image which captured an exercise motion of a person and information on whether the exercise motion of the person corresponding to the learning moving image is a hold motion.

The identifying a first frame interval and a second frame interval different from the first frame interval may include identifying, based on an exercise motion of the person being a symmetrical motion and a hold motion, an interval from a start frame to a first time as the first frame interval from among the plurality of frames in the moving image.

According to an example embodiment, a non-transitory computer readable recording medium may have stored thereon a program that when executed by a processor, causes an electronic device to perform operations corresponding to a method of controlling an electronic apparatus, the operations including: obtaining a moving image, identifying a person and pose data of the person from a plurality of frames in the moving image, obtaining exercise pattern information corresponding to the plurality of frames using pose data of the identified person, recognizing an exercise motion of the identified person by inputting at least one frame of the moving image into at least one neural network model and obtaining exercise feature information corresponding to the recognized exercise motion, identifying, based on the exercise feature information and the exercise pattern information, a first frame interval and a second frame interval different from the first frame interval from among the plurality of frames in the moving image, and providing information on an exercise motion corresponding to the second frame by comparing the first frame interval with the second frame interval.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 12 is a flowchart illustrating an example method of controlling an electronic apparatus according to various embodiments.

DETAILED DESCRIPTION

Figure 1:
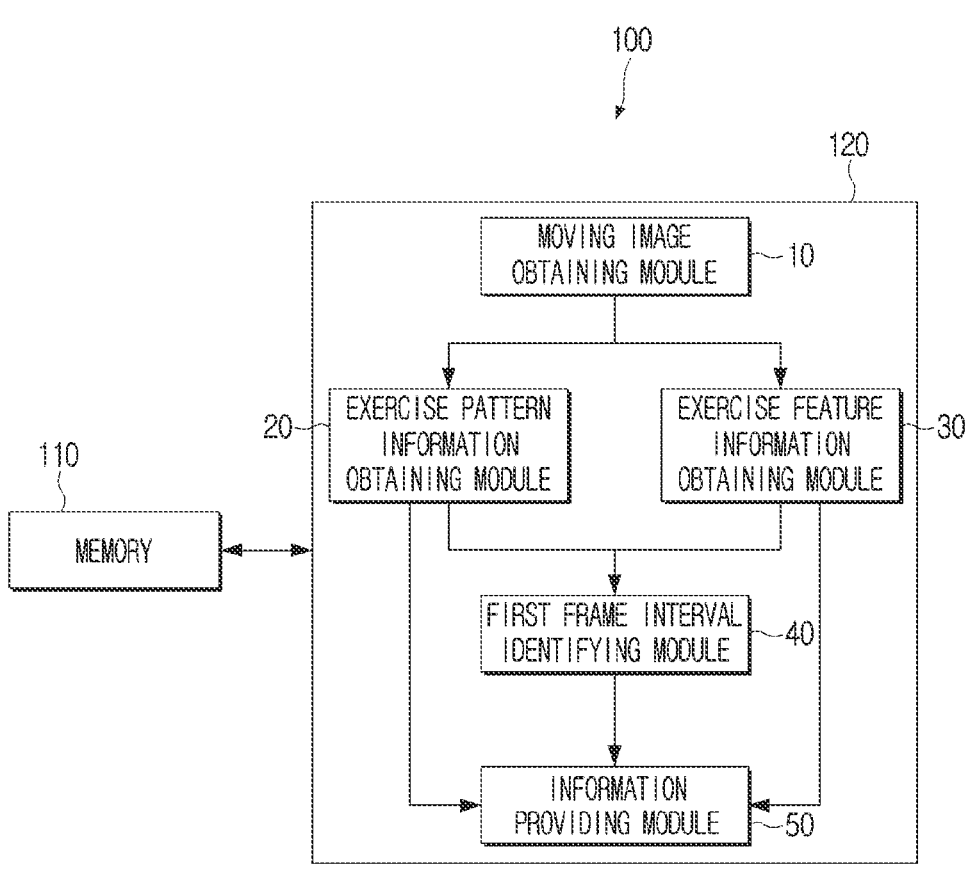
FIG. 1 is a block diagram illustrating an example configuration of an electronic apparatus according to various embodiments.

Various modifications may be made to the various example embodiments of the disclosure, and there may be various types of embodiments. Accordingly, example embodiments will be illustrated in drawings, and described in greater detail in the detailed description. However, it should be noted that the embodiments are not intended to limit the scope of the disclosure to a specific embodiment, but should be interpreted to include various modifications, equivalents and/or alternatives of the embodiments included herein. With respect to the description of the drawings, like reference numerals may be used to indicate like elements.

In describing the disclosure, in case it is determined that the detailed description of related known technologies may unnecessarily confuse the gist of the disclosure, the detailed description thereof may be omitted.

Further, the embodiments below may be modified to various different forms, and it is to be understood that the scope of the technical spirit of the disclosure is not limited to the embodiments below.

Terms used herein are simply used to describe a specific embodiment, and it is not intended to limit the scope of protection. A singular expression includes a plural expression, unless otherwise specified.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

On the other hand, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily refer, for example, to being "specifically designed to" in terms of hardware.

Rather, in a certain circumstance, the expression "a device configured to . . . " may refer, for example, to something that the device "may perform . . . " together with another device or components. For example, the phrase "a sub-processor configured to (or set up to) perform A, B, or C" may refer, for example, to a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

The term "module" or "part" used in the embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor.

The various elements and areas of the drawings have been schematically illustrated. Accordingly, the disclosure is not limited by relative sizes and distances illustrated in the accompanied drawings.

Embodiments of the disclosure will be described in greater detail below with reference to the accompanied drawings to aid in the understanding of those of ordinary skill in the art.

FIG. 1 is a block diagram illustrating an example configuration of an electronic apparatus according to various embodiments.

Referring to FIG. 1 which describes a configuration of the electronic apparatus according to an example embodiment, an electronic apparatus 100 may include a memory 110 and a processor (e.g., including processing circuitry) 120.

The memory 110 may store at least one instruction or data associated with at least one other element of the electronic apparatus 100. For example, the memory 110 may be implemented as a non-volatile memory, a volatile memory, a flash-memory, a hard disk drive (HDD), a solid state drive (SSD), or the like. The memory 110 may be accessed by the processor 120 and reading/writing/modifying/deleting/updating of data may be performed by the processor 120.

The term 'memory' used herein may include the memory 110, a read only memory (ROM; not shown) in the processor 120, a random access memory (RAM; not shown), or a memory card (not shown; e.g., a micro SD card, a memory stick) mounted to the electronic apparatus 100.

As described above, the memory 110 may store at least one instruction. The instruction may be for controlling the electronic apparatus 100. For example, in the memory 110, an instruction associated with an information providing function of an exercise motion of a person within a moving image may be stored. For example, the memory 110 may include a plurality of configurations (or modules) for providing information on an exercise motion of a person within a moving image according to an embodiment, and the above will be described below.

The processor 120 may be electrically coupled with the memory 110, may include various processing circuitry and control the overall operation and function of the electronic apparatus 100. For example, the processor 120 may provide information on an exercise motion of a person included in the moving image. As shown in FIG. 1, the processor 120 may include a moving image obtaining module (e.g., including various processing circuitry and/or executable program instructions) 10, an exercise pattern information obtaining module (e.g., including various processing circuitry and/or executable program instructions) 20, an exercise feature information obtaining module (e.g., including various processing circuitry and/or executable program instructions) 30, a first frame interval identifying module (e.g., including various processing circuitry and/or executable program instructions) 40, and an information providing module (e.g., including various processing circuitry and/or executable program instructions) 50, and the program instructions for each module may be stored in the memory 110.

Then, a plurality of modules 10 to 50 may be loaded in a memory (e.g., volatile memory) included in the processor 120 to provide information on the exercise motion of a person within the moving image. The processor 120 may load the plurality of modules 10 to 50 from a non-volatile memory to a volatile memory and execute respective functions of the plurality of modules 10 to 50. Loading may refer to an operation of calling data stored in the non-volatile memory to the volatile memory and storing the data for the processor 120 to access.

In an embodiment, although the information on the exercise motion may be provided through the plurality of modules 10 to 50 stored in the memory 110 as shown in FIG. 1, the embodiment is not limited thereto, and may be realized through an external device coupled with the electronic apparatus 100.

The plurality of modules 10 to 50 may be realized with respective software, but the embodiment is not limited thereto, and a portion of the modules may be realized through a combination of hardware and software. In an embodiment, the plurality of modules 10 to 50 may be realized with one software. In addition, a portion of the modules may be realized in the electronic apparatus 100, and other portion of the modules may be realized in an external device.

The moving image obtaining module 10 may be a configuration for obtaining a moving image which captured an exercise motion of a person.

For example, the moving image obtaining module 10 may obtain an original moving image. The original moving image may be a moving image that includes a warm-up motion, an exercise motion, and an exercise cool-down motion of a person, and the moving image may be a moving image with only an interval frame corresponding to an exercise motion of a person is extracted from the original moving image.

In an embodiment, the moving image obtaining module 10 may obtain the original moving image through a camera or a sensor included in the electronic apparatus 100, or obtain the original moving image through an external device or an external server. In an example, based on the electronic apparatus 100 being an apparatus that includes the camera or the sensor, the electronic apparatus 100 may obtain the original moving image by capturing a person through the camera or the sensor. In an example, if the electronic apparatus 100 is realized as a server, the electronic apparatus 100 may receive the original moving image from the external device that includes the camera or the sensor.

The moving image obtaining module 10 may obtain, based on an exercise data base (DB) in which a plurality of moving images that include a plurality of exercise motions is stored, a moving image by extracting a frame corresponding to an exercise motion of a person from among a plurality of frames included in the original moving image.

The exercise DB may be a data base stored with moving images that include various exercise motions. The exercise DB may be stored with moving images in which a specific person performing various exercise motions is captured at various angles. The exercise DB may be stored with moving images that include exercise motions, but is not limited thereto, and may also be stored with specific images that correspond to exercise motions.

The moving image obtaining module 10 may obtain, by excluding a warm-up motion interval and an exercise cool-down interval of a person from the original moving image, the moving image that includes only an exercise motion interval. Specifically, the moving image obtaining module 10 may compare an exercise motion of a person included in the exercise DB with the original moving image leaving only a frame that is similar, and obtain the moving image by cutting the remaining frames (e.g., frame corresponding to the warm-up motion and the exercise cool-down motion).

The exercise pattern information obtaining module 20 may be a configuration for obtaining pattern information of an exercise motion of a person included in the moving image. According to the disclosure, the pattern information may include speed information, period information, number of times information, and the like of an exercise motion of a person.

For example, the exercise pattern information obtaining module 20 may perform an image analysis (e.g., pose estimation) on the moving image, and identify a person from the plurality of frames in the moving image and pose data of the person. The pose data may be data with which joint movements of a person is identifiable by tracking a specific body part (e.g., joint areas such as elbows, shoulders, knees, etc.) of the person included in the moving image. In an example, the exercise pattern information obtaining module 20 may identify each of the specific body parts of the person in the moving image as key points, and obtain pose data by identifying the movements of the identified key points. In an example, the exercise pattern information obtaining module 20 may obtain pose data by inputting a moving image to a pose estimation neural network model which can identify pose data. Then, the exercise pattern information obtaining module 20 may analyze the obtained pose data, and obtain exercise pattern information (e.g., speed information, period information, number of times information, etc.) that corresponds to the plurality of frames in the moving image.

The exercise feature information obtaining module 30 may be a configuration for recognizing an exercise motion of a person included in the moving image and obtaining exercise feature information corresponding to the recognized exercise motion. Here, the exercise feature information may be information on whether the exercise motion of the person is a symmetrical motion or a hold motion.

According to the disclosure, the symmetrical motion may be a motion of performing one motion, and for example, a push-up exercise, a squat exercise, and a plank exercise may be included in the symmetrical motion. Further, a non-symmetrical motion may be a motion of performing at least two motions, and for example, a lunge exercise and a one-hand plank exercise may be included in the non-symmetrical motion.

Further, according to the disclosure, the hold motion may be a motion of holding a specific motion for a certain time, and for example, the plank exercise and the one-hand plank exercise may be included in the hold motion. Further, a non-hold motion may be a motion of repeating a specific motion without holding for a specific time, and for example, the push-up exercise and the squat exercise may be included in the non-hold motion.

In an embodiment, the exercise feature information obtaining module 30 may identify whether an exercise motion of a person included in the moving image is a symmetrical motion or a hold motion using, for example, and without limitation, a first neural network model for identifying whether it is the symmetrical motion and a second neural network model for identifying whether it is the hold motion.

The first neural network model may be a configuration for identifying whether the exercise motion of the person is a symmetrical motion, and for example, learning may be performed using a learning moving image which captured the exercise motion of the person as input data, and information of whether the exercise motion of the person corresponding to the relevant learning moving image is a symmetrical motion (False/True) as output data. The exercise feature information obtaining module 30 may input at least one frame of the moving image to the learning performed first neural network model, and identify whether the exercise motion of the person in the moving image is a symmetrical motion or a non-symmetrical motion.

The second neural network model may be a configuration for identifying whether the exercise motion of the person is a hold motion, and, for example, learning may be performed using a learning moving image which includes the exercise motion of the person as input data, and information on whether the exercise motion of the person corresponding to the relevant learning moving image is a hold motion (False/True) as output data. The exercise feature information obtaining module 30 may input the moving image to the learning performed second neural network model, and identify whether the exercise motion of the person in the moving image is a hold motion or a non-hold motion.

In an example, if the exercise motion of the person in the moving image is a plank exercise motion, the exercise feature information obtaining module 30 may input at least one frame of the moving image to the first neural network model and identify the exercise motion of the person in the moving image as a symmetrical motion, and input at least one frame of the moving image to the second neural network model and identify the exercise motion of the person in the moving image as a hold motion. However, if the exercise motion of the person in the moving image is a one-hand plank exercise motion, the exercise feature information obtaining module 30 may input at least one frame of the moving image to the first neural network model and identify the exercise motion of the person in the moving image as a non-symmetrical motion, and input at least one frame of the moving image to the second neural network model and identify the exercise motion of the person in the moving image as a hold motion.

In an example, if the exercise motion of the person in the moving image is a lunge exercise motion, the exercise feature information obtaining module 30 may input at least one frame of the moving image to the first neural network model and identify the exercise motion of the person in the moving image as a non-symmetrical motion, and input at least one frame of the moving image to the second neural network model and identify the exercise motion of the person in the moving image as a non-hold motion.

In the above-described embodiment, exercise feature information being obtained through two neural network models (the first neural network model and the second neural network model) is described, but the embodiment is not limited thereto, and the exercise feature information may be obtained through one neural network model or at least three neural network models. In an example, if one neural network model is used, the exercise feature information obtaining module 30 may input at least one frame of the moving image to the neural network model, and identify whether the exercise motion of the person in the moving image is a symmetrical motion or a non-symmetrical motion, and whether it is a hold motion or a non-hold motion.

The first frame interval identifying module 40 may be a configuration for identifying a frame interval that corresponds to an exercise motion of a reference state from among a plurality of frame intervals in the moving image. For example, the first frame interval identifying module 40 may identify the exercise feature information of the moving image and a frame interval (a first frame interval) corresponding to the exercise motion of the reference state in the moving image based on the exercise pattern information. The first frame interval identifying module 40 may identify, based on the exercise feature information and the exercise pattern information of the moving image, the frame interval corresponding to the exercise motion of the reference state of the person from among the plurality of frames included in the moving image as the first frame interval.

In an example, the frame interval corresponding to the exercise motion of the reference state may be a frame interval that corresponds to an initial exercise motion of a person from among the frames included in the moving image, but based on the exercise motion of the person in the moving image being a symmetrical motion or a non-symmetrical motion and being a hold motion or a non-hold motion, it may be differently identified respectively.

If the exercise motion of the person in the moving image is a symmetrical motion and a hold motion, the first frame interval identifying module 40 may identify an interval from a start frame to a first time from among the moving image as a frame corresponding to the first frame interval. The first time may be an initially set value, but is not limited thereto and may be a value set by a user of the electronic apparatus 100. In an example, if the exercise motion of the person in the moving image is a plank exercise motion, the exercise feature information obtaining module 30 may identify the exercise motion of the person as a symmetrical motion and a hold motion, and the first frame interval identifying module 40 may identify the interval from the start frame to the first time (e.g., five seconds) from among the moving image as the first frame interval.

If the exercise motion of the person in the moving image is a symmetrical motion and a non-hold motion, the first frame interval identifying module 40 may identify an exercise repetition interval for each of the plurality of frames in the moving image based on the exercise pattern information. The first frame interval identifying module 40 may identify the exercise repetition interval corresponding to one exercise motion from among the exercise motions of the person in the moving image based on the exercise pattern information that includes speed information, period information, number of times information, and the like of the exercise motion of the person in the moving image. In an example, if the exercise motion of the person in the moving image is a push-up exercise motion, the first frame interval identifying module 40 may identify each frame corresponding to the interval in which the push-up exercise motion is performed one time from among the plurality of frames in the moving image based on the exercise pattern information of the relevant moving image. The first frame interval identifying module 40 may identify an interval from the start frame of the moving image to a frame corresponding to the exercise repetition interval a first number of times (e.g., n times) as a frame corresponding to the first frame interval based on the identified exercise repetition interval. The first number of times may be an initially set number of times, but is not limited thereto and may be a number of times set by the user of the electronic apparatus 100. For example, if the exercise motion of the person in the moving image is a push-up exercise motion, the first frame interval identifying module 40 may identify an interval from the start frame of the moving image to a frame in which the push-up motion of the first number of times (e.g., five times) is performed as the first frame interval.

If the exercise motion of the person in the moving image is a non-symmetrical motion and a hold motion, the first frame interval identifying module 40 may identify a frame corresponding to an interval from a frame in which a first symmetrical exercise motion in first started to a second time (e.g., m seconds) from among the frames of the moving image and an interval from a frame in which a second symmetrical exercise motion is first started to the second time (e.g., m seconds) as the first frame interval based on the exercise pattern information.

For example, if the exercise motion of the person in the moving image is a non-symmetrical motion and a hold motion, the first frame interval identifying module 40 may respectively identify a first exercise interval that corresponds to the first symmetrical exercise motion and a second exercise interval that corresponds to the second symmetrical exercise motion from among the exercise motions included in the moving image based on the exercise pattern information which includes the speed information, the period information, the number of times information, and the like of the exercise motion of the person in the moving image.

In an example, if the exercise motion of the person in the moving image is a moving image of a one-hand plank exercise motion, the first frame interval identifying module 40 may identify a plank exercise motion which is performed by supporting a right hand to a floor as the first symmetrical exercise motion, and identify a plank exercise motion which is performed by supporting a left hand to the floor as the second symmetrical exercise motion from among the exercise motions of the person in the moving image based on the exercise pattern information. The first frame interval identifying module 40 may identify a frame of the first exercise interval that corresponds to the first symmetrical exercise motion and a frame of the second exercise interval that corresponds to the second symmetrical exercise motion in the moving image.

The first frame interval identifying module 40 may identify a frame that corresponds to an interval from a frame in which the first symmetrical exercise motion is first started to a second time (e.g., three seconds) and an interval from a frame in which the second symmetrical exercise motion is first started to the second time (e.g., three seconds) as the first frame interval from among the plurality of frames in the moving image.

If the exercise motion of the person in the moving image is a non-symmetrical motion and a non-hold motion, the first frame interval identifying module 40 may respectively identify frame intervals corresponding to the first symmetrical exercise motion and the second symmetrical exercise motion from among the plurality of frames in the moving image based on the exercise pattern information. The first frame interval identifying module 40 may identify a frame corresponding to the first symmetrical exercise motion of a second number of times and a frame corresponding to the second symmetrical exercise motion of a second number of times from the start frame as the first frame interval from among the plurality of frames in the moving image. The second number of times may be an initially set number of times, but is not limited thereto and may be a number of times set by the user of the electronic apparatus 100.

In an example, if the exercise motion of the person in the moving image is a lunge exercise motion, the first frame interval identifying module 40 may respectively identify a frame corresponding to the first symmetrical exercise motion in which a right foot of the person is bent at a front and a frame corresponding to the second symmetrical exercise motion in which a left foot of the person is bent at the front from among the plurality of frames in the moving image based on the exercise pattern information. The first frame interval identifying module 40 may identify the frame in which the first symmetrical exercise motion is performed by the second number of times and the frame in which the second symmetrical exercise motion is performed by the second number of times as the first frame interval from among the plurality of frames in the moving image.

In an example, if the person in the moving image alternately performs the first symmetrical exercise motion and the second symmetrical exercise motion each one time (performing the first symmetrical exercise motion first), the first frame interval identifying module 40 may identify an interval from the start frame of the moving image to a frame in which the second symmetrical exercise motion is first performed by the second number of times as the first frame interval.

In an example, if the second symmetrical exercise motion is performed by a specific number of times after the person in the moving image performs the first symmetrical exercise motion by the specific number of times, the first frame interval identifying module 40 may identify an interval of a frame from the start frame of the moving image to an interval in which the first symmetrical exercise motion is performed by the second number of times and from a frame in which the second symmetrical exercise motion is first started to a frame in which the second symmetrical exercise motion is performed by the second number of times as the first frame interval.

The information providing module 50 may be a configuration for providing information on an exercise motion by comparing the first frame interval with an exercise motion being performed by a person in a current interval in the moving image.

For example, the information providing module 50 may identify a difference value of the exercise pattern information of the first frame interval identified through the first frame interval identifying module 40 and the exercise pattern information of the second frame interval which is a current frame.

According to the disclosure, if the moving image is being played, the second frame interval may be a frame of a preset (e.g., specified) interval from a frame that is currently being played.

In an example, if the exercise motion of the person in the moving image is a hold motion, the second frame interval may be an interval of 10% of a one-time hold interval of the person in a hold motion moving image that is stored in the exercise DB. For example, if the one time hold interval of the person in the hold motion moving image that is stored in the exercise DB is one minute, the second frame interval corresponding to the hold motion may be six seconds.

In an example, if the exercise motion of the person in the moving image is a symmetrical motion, the second frame interval may be a time interval necessary for when the person in a symmetrical motion moving image that is stored in the exercise DB repeats the motion an average of three times, and may be, for example, three seconds.

The information providing module 50 may identify a difference value of the two exercise pattern information using a distance algorithm to compare the exercise pattern information of the first frame interval and the exercise pattern information of the second frame interval. In an example, the information providing module 50 may convert a plurality of key points included in the exercise pattern information to vectors, identify a closest vector between the converted vectors, and identify a difference value of the two exercise pattern information using a cosine distance algorithm which compares the exercise pattern information.

The information providing module 50 may identify, based on a difference value of the exercise pattern information of the first frame interval and the exercise pattern information of the second frame interval being greater than or equal to a pre-set (e.g., specified) value, as being in a physically depleted state. In an example, the pre-set value may be set differently according to the exercise feature information that corresponds to the exercise motion that is being performed by the person in the moving image, respectively.

Based on being identified as in a physically depleted state, the information providing module 50 may provide information on the second frame interval. The information on the second frame interval may include information for guiding the exercise motion of the person in the second frame interval, and may be message information such as "raise your hips higher" when, for example, the exercise motion of the person is the plank exercise motion.

In an example, if the electronic apparatus 100 includes a display, the information providing module 50 may display a user interface (UI) that includes information on the second frame interval on the display of the electronic apparatus 100. In an example, if the electronic apparatus 100 includes a speaker, the information providing module 50 may output a voice that includes information on the second frame interval through the speaker.

However, the embodiment is not limited thereto, and information on the second frame interval may be provided even when the difference value of the exercise pattern information of the first frame interval and the exercise pattern information of the second frame interval is less than a pre-set value. In this case, the information providing module 50 may provide message information notifying that the exercise motion of the second frame interval is being performed well.

In the related art, physical information corresponding to an exercise motion pose of a person was obtained through pre-learning, and feedback on a current exercise motion was provided based on the physical information. In order to obtain the physical information described above, exercise motion poses corresponding to each of all exercise motions had to be pre-learned in the related art and there has been a problem of excessive cost being spent in the pre-learning. Accordingly, the electronic apparatus 100 according to the disclosure may provide, based on the above-described embodiments, information on exercise motions of a person in real-time without pre-learning of the physical information of each exercise motion pose.

Figure 2A:
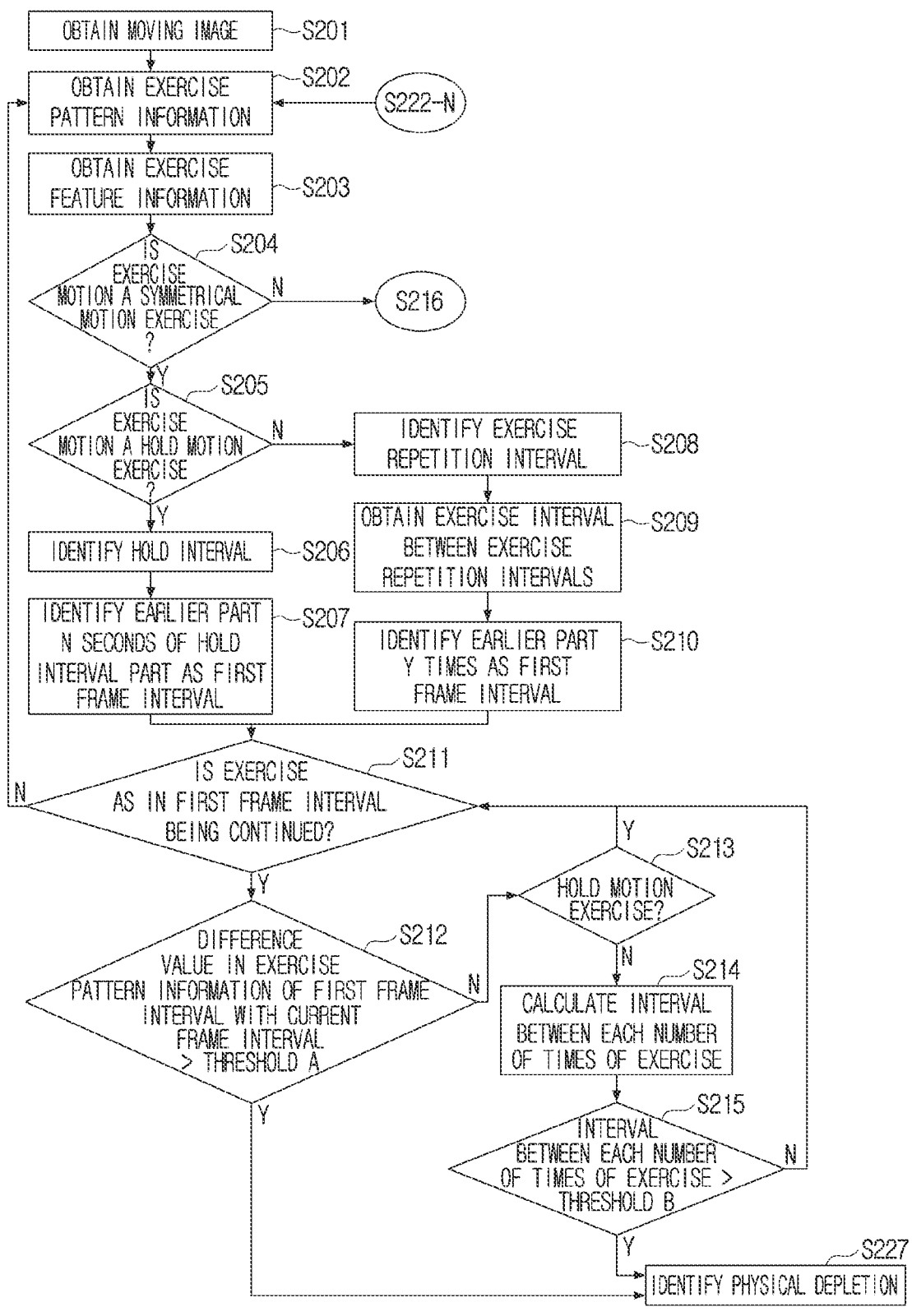
FIG. 2A is a flowchart illustrating an example operation of an electronic apparatus for providing information on an exercise motion of a person within a moving image according to various embodiments.
Figure 2B:
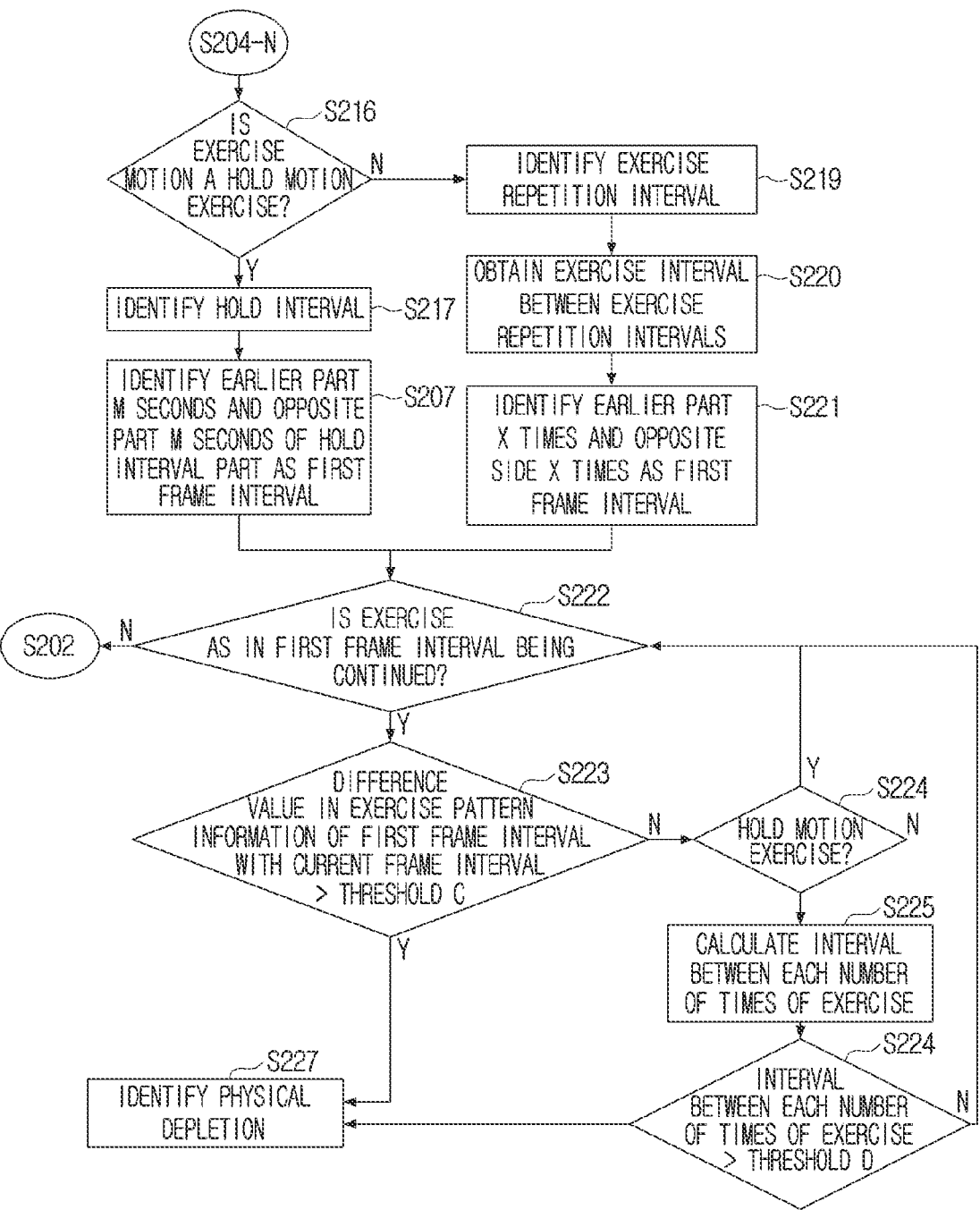
FIG. 2B is a flowchart illustrating an example operation of an electronic apparatus for providing information on an exercise motion of a person within a moving image according to various embodiments.

FIG. 2A and FIG. 2B are flowcharts illustrating an example operation of the electronic apparatus 100 for providing information on an exercise motion of a person within a moving image according to various embodiments.

Referring to FIG. 2A, the electronic apparatus 100 may obtain a moving image (S201). For example, the moving image may be a moving image with only a frame of an interval corresponding to the exercise motion of the person extracted from among the plurality of frames in the original moving image obtained by the electronic apparatus 100.

Figure 3:
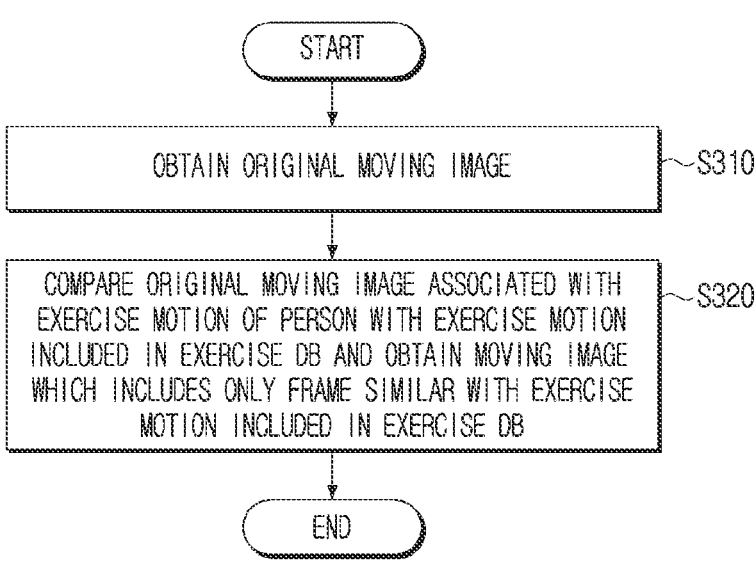
FIG. 3 is a flowchart illustrating an example method of obtaining a moving image according to various embodiments.

The above will be described in greater detail with reference to FIG. 3.

For example, the electronic apparatus 100 may obtain an original moving image associated with the exercise motion of the person (S310).

The electronic apparatus 100 may obtain a moving image associated with the exercise motion by removing an outlier through an outlier analysis from the original moving image.

The outlier may refer to data that is beyond a general feature of a given data. The electronic apparatus 100 may identify an outlier through an outlier analysis, and remove the outlier from the original moving image.

For example, the original moving image may include an exercise motion interval, a warm-up exercise motion interval associated with the exercise motion, and an exercise cool-down interval. At this time, the electronic apparatus 100 may remove frames for the exercise motion interval and the exercise cool-down interval included in the original moving image through the outlier analysis, and obtain the moving image that includes the exercise motion interval.

The electronic apparatus 100 may calculate a degree of similarity with an exercise motion included in the exercise DB by comparing the original moving image associated with the exercise motion of the person with the exercise motion included in the exercise DB, and obtain a moving image that includes only frames of which the degree of similarity is greater than or equal to a pre-set value (S320). The electronic apparatus 100 may compare the exercise motions included in the original moving image and the exercise DB using an algorithm (e.g., Dynamic Time Warping) through which a pattern of a time-series data may be compared. The electronic apparatus 100 may obtain exercise pattern information based on the moving image (S202). For example, the electronic apparatus 100 may perform an image analysis (e.g., a pose estimation) on the moving image, and obtain pose data of the person in the moving image. Then, the exercise pattern information obtaining module 20 may analyze the obtained pose data, and obtain pattern information (e.g., speed information, period information, number of times information, etc.) of the exercise motion of the person.

The electronic apparatus 100 may obtain, from the user, a user input for analyzing the pose data. For example, a body shape of the person performing the exercise motion included in the exercise DB and a body shape of the user included in the original moving image may vary. At this time, a difficult problem of obtaining accurate pose data may arise according to a difference in body shape.

Accordingly, the electronic apparatus 100 may provide a UI for receiving input of information on a physical body shape of a person performing the exercise motion included in the exercise DB through the display, and receive input of information on the physical body shape from the user through the provided UI. Alternatively, the electronic apparatus 100 may provide a UI for receiving input of information on a body shape of the person included in the moving image through the display, and receive input of information on the physical body shape from the user through the provided UI. At this time, the body shape may refer to height, weight, sex, and the like.

The electronic apparatus 100 may obtain exercise feature information based on the moving image (S203). The exercise feature information may include information on whether the exercise motion of the person in the moving image is a symmetrical motion and a hold motion. For example, the electronic apparatus 100 may identify whether the exercise motion included in the moving image is a symmetrical motion and a hold motion using the first neural network model for identifying whether it is a symmetrical motion and the second neural network model for identifying whether it is a hold motion.

The electronic apparatus 100 may identify whether the exercise motion is a symmetrical motion exercise (S204).

If the exercise motion is the symmetrical motion exercise (S204-Y), the electronic apparatus 100 may identify whether the exercise motion is a hold motion (S205).

If the exercise motion is the hold motion exercise (S205-Y), that is if the exercise motion is the symmetrical motion exercise and the hold motion exercise, the electronic apparatus 100 may identify a hold interval (S206). The electronic apparatus 100 may identify an earlier part of N seconds of a hold interval part as the first frame interval (S207). For example, based on the exercise pattern information, the electronic apparatus 100 may identify the hold interval of the exercise motion from among the moving image, and identify an interval from the start frame to N seconds (first time) of the first hold interval as the first frame interval.

Figure 4:
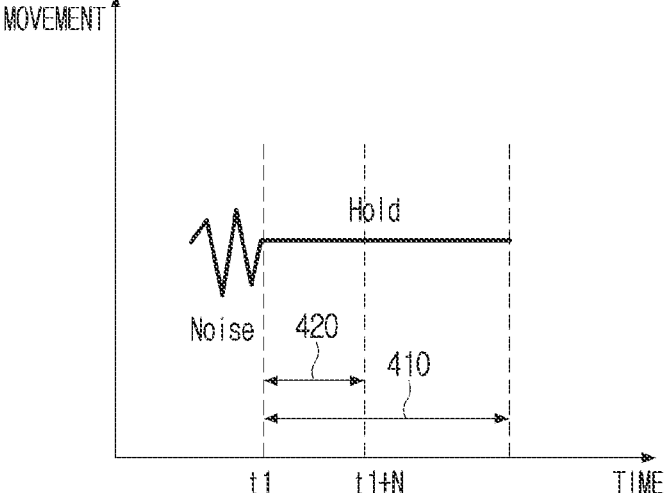
FIG. 4 is a graph illustrating an example method of identifying a first frame interval from a symmetrical motion exercise and a hold motion exercise according to various embodiments.

For example, the exercise motion may be a symmetrical motion exercise and a hold motion exercise such as a 'plank.' Information on the exercise motion of the user in the moving image may be as shown in FIG. 4. The x-axis may represent time, the y-axis may represent information on a movement of the user, and the graph may represent information on a movement of the user. The identified hold interval may be a first interval 410. The first interval may be an interval in which the plank which is a symmetrical motion exercise and a hold motion exercise is being performed. The electronic apparatus 100 may identify a second interval 420 which corresponds to an initial N seconds of the first interval as the first frame interval.

If the exercise motion is the symmetrical motion exercise or the exercise motion is not the hold motion (S205-N), that is, if the exercise motion is a symmetrical motion exercise and a non-hold motion exercise, the electronic apparatus 100 may identify an exercise repetition interval (S208). The electronic apparatus 100 may obtain an exercise interval between the exercise repetition intervals (S209). The electronic apparatus 100 may identify an earlier part of Y times as the first frame interval (S210). For example, the electronic apparatus 100 may identify the exercise repetition interval based on the exercise pattern information. The electronic apparatus 100 may identify an exercise repetition interval corresponding to the exercise motion of one time from among the exercise motions included in the moving image based on the exercise pattern information which includes speed information, period information, number of times information, and the like of the exercise motion of the person. The electronic apparatus 100 may obtain the exercise interval between the exercise motions of one time, and identify an interval from a first exercise motion to a Y number of times (first number of times) as the first frame interval.

Figure 5:
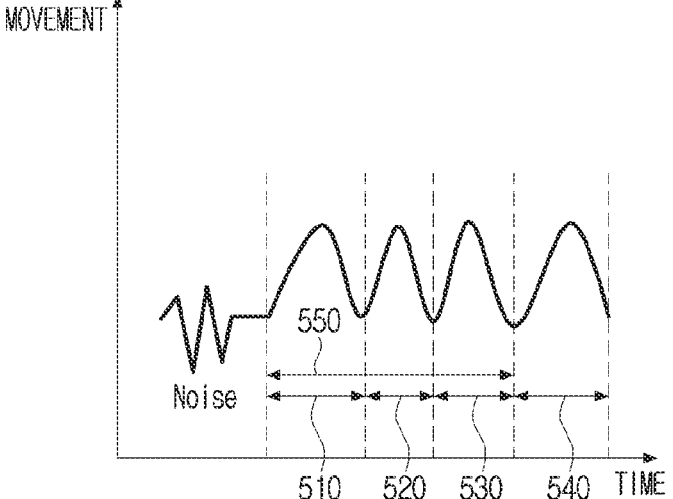
FIG. 5 is a graph illustrating an example method of identifying a first frame interval from a symmetrical motion exercise and a non-hold motion exercise according to various embodiments.

For example, the exercise motion may be a symmetrical motion exercise and a non-hold motion exercise such as a 'squat.' Information on the exercise motion of the user in the moving image may be as shown in FIG. 5. The x-axis may represent time, the y-axis may represent information on a movement of the user, and the graph may represent information on the movement of the user. The identified exercise repetition interval may be a first interval 510, a second interval 520, a third interval 530, and a fourth interval 540. Each interval may be an interval in which an exercise motion is performed one time. If Y times is three times, the electronic apparatus 100 may identify the initial three intervals 510, 520, and 530 of the exercise repetition interval as a first frame interval 550.

When the first frame interval is identified through operations S207 to S210, the electronic apparatus 100 may identify whether the exercise motion as in the first frame interval is continued (S211). For example, the electronic apparatus 100 may compare the exercise pattern information of the first frame interval with the exercise pattern information of the exercise motion (second frame interval) that is currently being performed, and identify whether the exercise motion (exercise motion in the second frame interval) that is currently being performed is an exercise motion that is the same as in the first frame interval.

If the exercise motion as in the first frame interval is identified as not continued (S211-N), the electronic apparatus 100 may return to step S202 to obtain the exercise pattern information of the current exercise motion and perform a step thereafter.

If the exercise motion as in the first frame interval is identified as continued (S211-Y), the electronic apparatus 100 may identify whether a difference value of the exercise pattern information of the first frame interval and the current frame interval (second frame interval) exceeds a first set value (Threshold A) (S212). For example, the electronic apparatus 100 may identify a difference value of the exercise pattern information of the first frame interval and the exercise pattern information of the current frame interval (second frame interval).

If the difference value of the exercise pattern information of the first frame interval and the current frame interval (second frame interval) exceeds the first set value (Threshold A), the electronic apparatus 100 may identify as a physical strength of the person in the moving image being depleted (S227).

If a difference value of exercise pattern information of the first frame interval and the current frame interval does not exceed the first set value (Threshold A) (S212-N), the electronic apparatus 100 may identify whether the exercise motion corresponding to the first frame interval is a hold motion exercise (S213).

If the exercise motion corresponding to the first frame interval is the hold motion exercise (S213-Y), the electronic apparatus 100 may return to S211 to identify whether the exercise motion as in the current first frame interval is continued (S211).

If the exercise motion corresponding to the first frame interval is not the hold motion exercise (S213-N), that is, if the exercise motion corresponding to the first frame interval is a non-hold motion, the electronic apparatus 100 may obtain (e.g., calculate) an interval between each time of exercise (S214). The electronic apparatus 100 may identify whether the interval between each time of exercise exceeds a second set value (Threshold B) (S215).

Even if there is not much difference in an exercise pose of the user in the first frame interval and an exercise pose of the user in the second frame interval, the electronic apparatus 100 may identify whether a time spent by the user in performing a same motion in the first frame interval and a time spent by the user in performing the same motion in the second frame interval exceeds a pre-set setting value.

Figure 6:
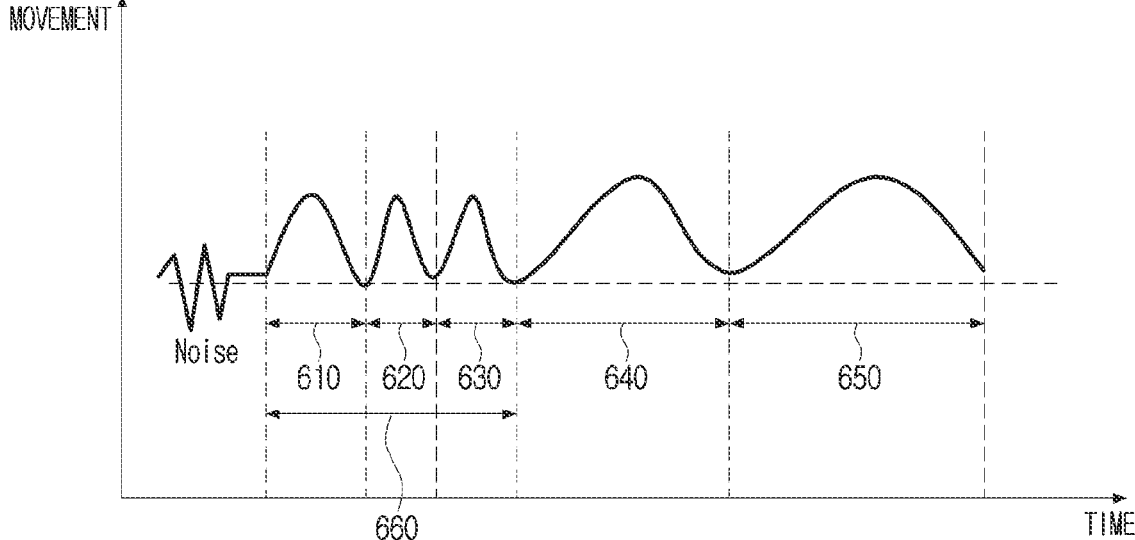
FIG. 6 is a graph illustrating an example method of identifying whether an interval between each time of exercise exceeds a set value from a non-hold motion exercise according to various embodiments.

For example, the exercise motion may be a symmetrical motion and a non-hold motion exercise such as a 'squat.' The information on the exercise motion of the user in the moving image may be as shown in FIG. 6. A first interval 610, a second interval 620, a third interval 630, a fourth interval 640, and a fifth interval 650 may be intervals in which one exercise motion is performed respectively. Further, a first frame interval 660 may be three intervals 610, 620, and 630 of an initial interval, and a second frame interval may be a fifth interval 650. Time spent in performing one exercise motion in each of the first interval 610, the second interval 620, the third interval 630, the fourth interval 640, and the fifth interval 650 may be five seconds, three seconds, four seconds, seven seconds, and eight seconds. Further, the second set value may be three seconds.

The interval between each time of exercise may refer to the time spent in performing one exercise motion in each interval. Alternatively, the interval between each time of exercise may refer to a difference with time spent in performing the exercise motion one time just previously.

For example, the electronic apparatus 100 may compare an average time spent in performing one exercise motion in the first frame interval 660 and the time spent in performing one exercise motion in a second frame interval 650. Then, the electronic apparatus 100 may compare a difference between the average time spent in performing one exercise motion in the first frame interval 660 and the time spent in performing one exercise motion in the second frame interval 650 with a pre-set second set value.

At this time, the average time spent in performing one exercise motion in the first frame interval 660 may be four seconds which is the average time of five seconds, three seconds, and four seconds. The time spent in performing one exercise motion in the second frame interval 650 may be eight seconds. Because a difference between the average time spent in performing one exercise motion in the first frame interval 660 and the time spent in performing one exercise motion in the second frame interval 650 is four seconds, and the second set value is three seconds, the electronic apparatus 100 may identify the interval between each time of exercise as exceeding the second set value.

Alternatively, the electronic apparatus 100 may compare a difference between a minimum time from among the time spent in performing one exercise motion in the first frame interval 660 and the time spent in performing one exercise motion in the second frame interval with the second set value.

For example, the minimum time from among the time spent in performing one exercise motion in the first frame interval 660 may be three seconds. Further, the time spent in performing one exercise motion in the second frame interval may be eight seconds. Further, the second set value may be three seconds. At this time, because a difference between three seconds which is the minimum time from among the time spent in performing one exercise motion in the first frame interval 660 and eight seconds which is the time spent in performing one exercise motion in the second frame interval 650 is five seconds, the electronic apparatus 100 may identify the interval between each time of exercise as exceeding the second set value.

Alternatively, the electronic apparatus 100 may compare a difference between a maximum time from among the time spent in performing one exercise motion in the first frame interval 660 and the time spent in performing one exercise motion in the second frame interval with the second set value. Like the above-described method, the electronic apparatus 100 may identify whether the interval between each time of exercise exceeds the second set value.

If the interval between each time of exercise not exceed the second set value (Threshold B) (S215-N), the electronic apparatus 100 may return to step S211 to identify whether an exercise motion as the same as the exercise motion corresponding to the first frame interval is continued (S211).

If the interval between each time of exercise exceeds the second set value (Threshold B) (S215-Y), the electronic apparatus 100 may identify as the physical strength of the person in the moving image being depleted (S227).

In operation 204, referring to FIG. 2B, if the exercise motion is not the symmetrical motion exercise (S204-N), that is, if the exercise motion is a non-symmetrical motion exercise, the electronic apparatus 100 may identify whether the exercise motion is a hold motion (S216).

If the exercise motion is the hold motion exercise (S216-Y), that is, if the exercise motion is a non-symmetrical motion exercise, and a hold motion exercise, the electronic apparatus 100 may identify a hold interval (S217). The electronic apparatus 100 may identify an earlier part m seconds and an opposite part m seconds of the hold interval part as the first frame interval (S218). For example, the electronic apparatus 100 may identify a frame corresponding to an interval from a frame in which the first symmetrical exercise motion is first started to m seconds (second time) and an interval from a frame in which the second symmetrical exercise motion is first started to m seconds (second time) from among the moving image as the first frame interval based on the exercise pattern information.

Figure 7:
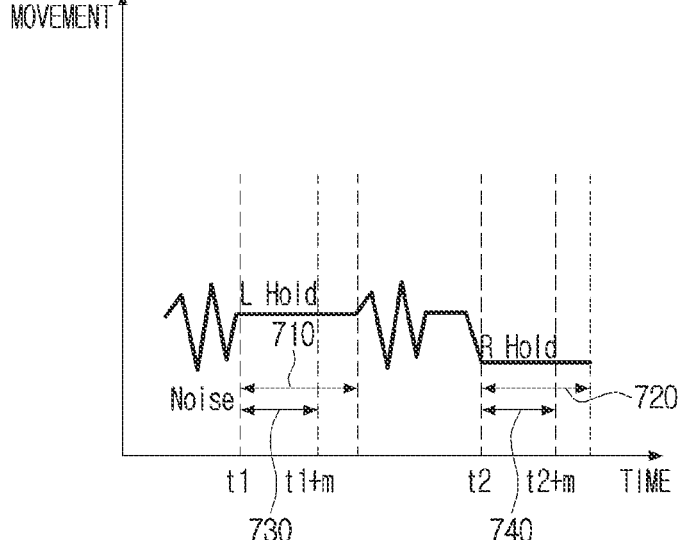
FIG. 7 is a graph illustrating an example method of identifying a first frame interval from a non-symmetrical motion exercise and a hold motion exercise according to various embodiments.

For example, the exercise motion may be a non-symmetrical motion exercise and a hold motion exercise such as a 'one-hand plank.' Information on the exercise motion of the user in the moving image may be as shown in FIG. 7. The x-axis may represent time, the y-axis may represent information on a movement of the user, and the graph may represent information on the movement of the user. The non-symmetrical motion exercise may include a first exercise motion and a second exercise motion. The earlier part of the identified hold interval (first exercise motion interval) may be a first interval 710 and a latter part of the hold interval (second exercise motion interval) may be a second interval 720. An exercise from the first interval (first exercise motion) and an exercise from the second interval (second exercise motion) may be a non-symmetrical motion. The electronic apparatus 100 may identify a third interval 730 that corresponds to m seconds from among the earlier part of the hold interval and a fourth interval 740 that corresponds to m seconds from among the latter part of the hold interval as the first frame interval.

If the exercise motion is not the hold motion exercise (S216-N), that is, if the exercise motion is a non-symmetrical motion exercise and a non-hold motion exercise, the electronic apparatus 100 may identify the exercise repetition interval (S219). The electronic apparatus 100 may obtain the exercise interval between the exercise repetition intervals (S220). The electronic apparatus 100 may identify an earlier part x times and an opposite side x times as the first frame interval (S221). Specifically, the electronic apparatus 100 may identify a frame corresponding to the first symmetrical exercise motion of x times (second number of times) and a frame corresponding to the second symmetrical exercise motion of x times (second number of times) from the start frame as the first frame interval from among the moving image.

Figure 8:
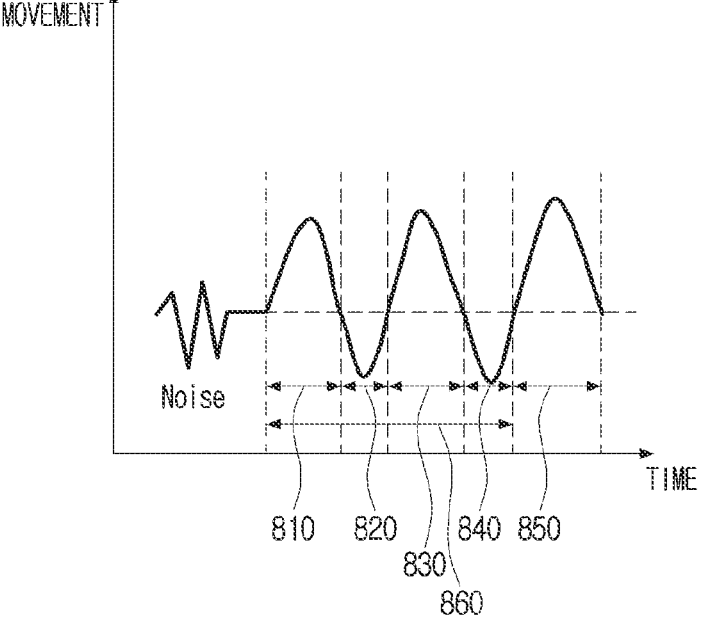
FIG. 8 is a graph illustrating an example method of identifying a first frame interval from a non-symmetrical motion exercise and a non-hold motion exercise according to various embodiments.

For example, the exercise motion may be a non-symmetrical motion exercise, and a non-hold motion exercise such as a 'lunge.' Information on the exercise motion of the user in the moving image may be as shown in FIG. 8. The x-axis may represent time, the y-axis may represent information on a movement of the user, and the graph may represent information on the movement of the user. The non-symmetrical motion exercise may include the first exercise motion and the second exercise motion. The identified exercise repetition interval may be a first interval 810, a second interval 820, a third interval 830, a fourth interval 840, and a fifth interval 850. A repetition interval of the first exercise motion may be the first interval 810, the third interval 830, and the fifth interval 850. Further, a repetition interval of the second exercise motion may be the second interval 820 and the fourth interval 840. Here, if x times is two times, the electronic apparatus 100 may identify a sixth interval 860 which includes two first exercise motion intervals and two second exercise motion intervals as the first frame interval.

When the first frame interval is identified through operations S218 and S221, the electronic apparatus 100 may identify whether the exercise motion as in the current first frame interval is continued (S222). For example, the electronic apparatus 100 may compare the exercise pattern information of the first frame interval with the exercise pattern information of the current frame interval (second frame interval), and identify whether the exercise motion of the current frame interval is an exercise motion that is the same as in the first frame interval.

If the exercise motion as in the first frame interval is identified as not continued (S222-N), the electronic apparatus 100 may return to operation S202 to obtain the exercise pattern information of the current exercise motion and perform the step thereafter.

If the exercise motion as in the first frame interval is identified as continued (S222-Y), the electronic apparatus 100 may identify whether a difference value of the exercise pattern information of the first frame interval and the current frame interval exceeds a third set value (Threshold C) (S223). For example, the electronic apparatus 100 may identify the difference value of the exercise pattern information of the first frame interval and the exercise pattern information of the current frame interval (second frame interval).

If it is identified that the difference value of the exercise pattern information of the first frame interval and the current frame interval exceeds the third set value (S223-Y), the electronic apparatus may identify that the physical strength of the person in the moving image being depleted (S227).

If the difference value of the exercise pattern information of the first frame interval and the exercise pattern information of the current frame interval (second frame interval) not exceed the third set value (Threshold C) (S223-N), the electronic apparatus 100 may identify whether the exercise motion of the first frame interval is a hold motion exercise (S224).

If the exercise motion of the first frame interval is the hold motion exercise (S224-Y), the electronic apparatus 100 may return to operation S222 to identify whether the exercise motion as in the first frame interval is continued (S222).

If the exercise motion of the first frame interval is not the hold motion exercise (S224-N), that is, if the exercise motion of the first frame interval is a non-hold motion, the electronic apparatus 100 may obtain (e.g., calculate) the interval between each time of exercise (S225). The electronic apparatus 100 may identify whether the interval between each time of exercise exceeds a fourth set value (Threshold D) (S226).

Figure 9:
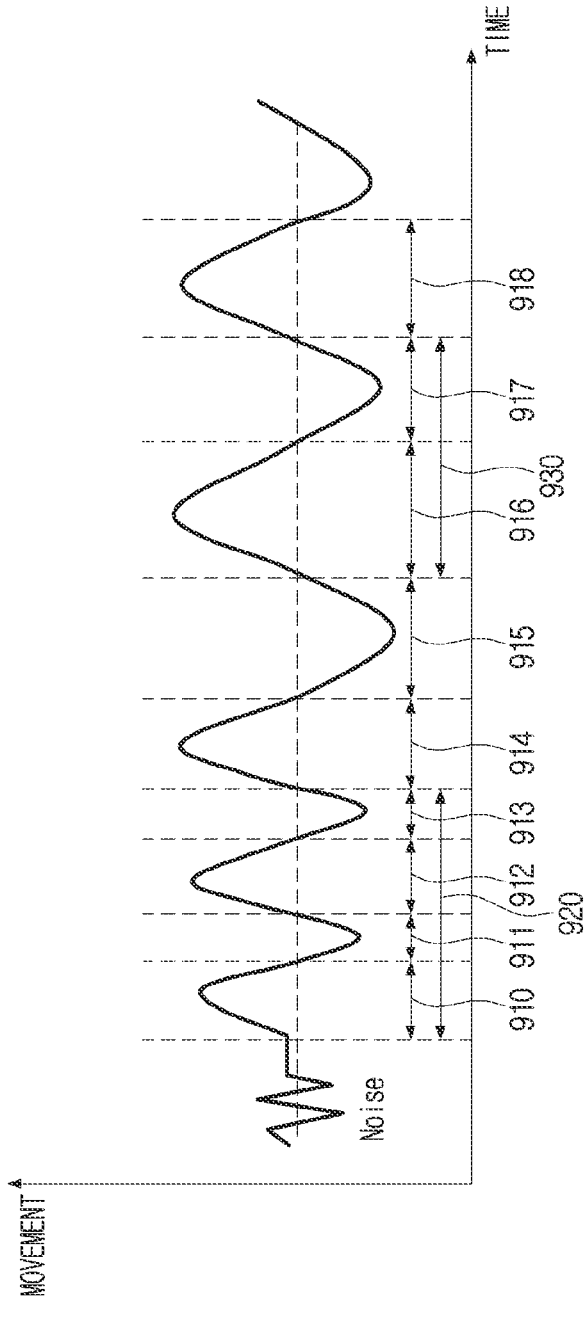
FIG. 9 is a graph illustrating an example method of identifying whether an interval between each time of exercise exceeds a set value from a non-hold motion exercise according to various embodiments.

For example, the exercise motion may be a non-symmetrical motion and a non-hold motion exercise such as a 'lunge.' The non-symmetrical motion may include the first symmetrical exercise motion and the second symmetrical exercise motion. At this time, the information on the exercise motion of the user in the moving image may be as shown in FIG. 9. A first interval 910, a second interval 911, a third interval 912, a fourth interval 913, a fifth interval 914, a sixth interval 915, a seventh interval 916, a eighth interval 917 and an eighth interval 918 may be intervals in which one first symmetrical exercise motion or one second symmetrical exercise motion is performed respectively. Further, a first frame interval may be an interval 920 in which the non-symmetrical motion is initially performed two times, and the second frame interval may be an interval 930. Time spent in performing one first symmetrical exercise motion or one second symmetrical exercise motion in each of the first interval 910, the second interval 911, the third interval 912, the fourth interval 913 and the fifth interval 914, the sixth interval 915, the seventh interval 916, the eighth interval 917 and the ninth interval 918 may be five seconds, four seconds, four seconds, three seconds, five seconds, six seconds, seven seconds, six seconds, and eight seconds. Further, a fourth set value may be three seconds.

The interval between each time of exercise may refer to time spent in performing one non-symmetrical exercise motion (e.g., one first symmetrical exercise motion and one second symmetrical exercise motion).

For example, the electronic apparatus 100 may compare an average time spent in performing one non-symmetrical exercise motion in a first frame interval 920 with time spent in performing one non-symmetrical exercise motion in a second frame interval 930. The electronic apparatus 100 may compare a difference between an average time spent in performing one non-symmetrical exercise motion in a first frame interval 760 with time spent in performing one non-symmetrical exercise motion in a second frame interval 750 with a pre-set fourth set value.

The average time spent in performing one non-symmetrical exercise motion in the first frame interval 760 may be nine sections which is the average time of nine seconds, seven seconds, and eleven seconds. Then, the time spent in performing one non-symmetrical exercise motion in the second frame interval 930 may be fifteen seconds. Because a difference between the average time spent in performing one exercise motion in the first frame interval 760 and the time spent in performing one exercise motion in the second frame interval 750 is six seconds, and the fourth set value is three seconds, the electronic apparatus 100 may identify the interval between each time of exercise as exceeding the fourth set value.

Alternatively, the electronic apparatus 100 may compare a difference between a minimum time from among the time spent in performing one non-symmetrical exercise motion in the first frame interval 760 and the time spent in performing one non-symmetrical exercise motion in the second frame interval with the fourth set value.

For example, the minimum time from among the time spent in performing one non-symmetrical exercise motion in the first frame interval 760 may be seven seconds. Further, the time spent in performing one non-symmetrical exercise motion in the second frame interval 750 may be fifteen seconds. Because a difference between seven seconds which is the minimum time from among the time spent in performing one non-symmetrical exercise motion in the first frame interval 760 and fifteen seconds which is the time spent in performing one non-symmetrical exercise motion in the second frame interval 750 is eight seconds, the electronic apparatus 100 may identify the interval between each time of exercise as exceeding the fourth set value.

Alternatively, the electronic apparatus 100 may compare a difference between a maximum time from among the time spent in performing one exercise motion in the first frame interval 760 and the time spent in performing one exercise motion in the second frame interval with the fourth set value. As in the above-described method, the electronic apparatus 100 may identify whether the interval between each time of exercise exceeds the fourth set value. If the interval between each time of exercise not exceed the fourth set value (Threshold D) (S226—N), the electronic apparatus may return to step S222 to identify whether the exercise motion as in the current first frame interval is continued (S222).

If the interval between each time of exercise exceeds the fourth set value (Threshold D) (S226—Y), the electronic apparatus 100 may identify as the physical strength of the person in the moving image being depleted (S227).

If the physical strength of the person in the moving image is identified as depleted, the electronic apparatus 100 may provide information on the exercise motion. At this time, the information on the exercise motion may be information on the second frame interval. The information on the second frame interval may include information for guiding the exercise motion of the person in the second frame interval.

Figure 10:
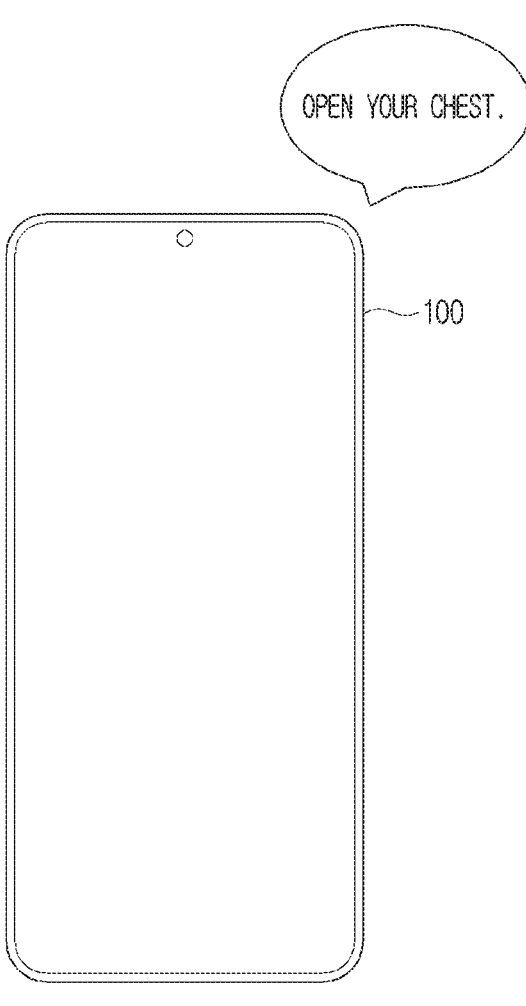
FIG. 10 is a diagram illustrating an example method in which an electronic apparatus provides information on an exercise motion according to various embodiments.

For example, if the physical strength is identified as being depleted, the electronic apparatus 100 may provide information for guiding the exercise motion of the person in the second frame interval. For example, if the exercise motion of the person is a 'squat,' the electronic apparatus 100 may provide a voice such as "Open your chest." as shown in FIG. 10 through the speaker included in the electronic apparatus 100. Alternatively, the electronic apparatus 100 may provide a notification sound for proving information that a problem has occurred with a pose of the exercise motion due to the physical strength of the user being depleted.

Alternatively, the electronic apparatus 100 may provide, while an exercise moving image of the user is being captured, the moving image being captured through the display included in the electronic apparatus 100. At this time, if it is identified as the physical strength being depleted while the user is performing the exercise, the electronic apparatus 100 may provide information guiding a pose of the exercise motion in a screen which is provided through the display.

The information guiding the pose of the exercise motion may be information for showing a specific point of the body of the person.

Figure 11:
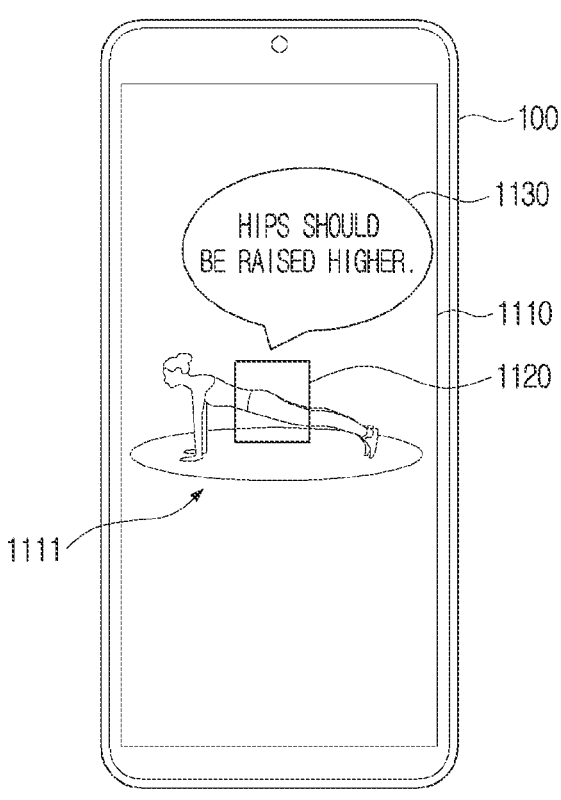
FIG. 11 is a diagram illustrating an example method in which an electronic apparatus provides information on an exercise motion according to various embodiments.

For example, if the exercise motion of the person is a 'plank,' the electronic apparatus 100 may provide an exercise motion image 1111 of the person being captured through a display 1110 as shown in FIG. 11. If the physical strength is identified as depleted, the electronic apparatus 100 may provide a mark 1120 for specifying the body part together therewith to guide the exercise motion of the user on the display 1110. At this time, the electronic apparatus 100 may provide a message 1130 together therewith to guide the specified body part on the display 1110.

Alternatively, the electronic apparatus 100 may provide the mark 1120 for specifying the body part to guide the exercise motion of the user through the display 1110, and provide voice information (e.g., "hips should be raised higher") that guides the exercise motion of the user together therewith through the speaker included in the electronic apparatus 100.

FIG. 12 is a flowchart illustrating an example method of controlling the electronic apparatus according to various embodiments.

The electronic apparatus 100 may obtain a moving image (S1210). For example, the electronic apparatus 100 may obtain an original moving image and obtain, based on the exercise data base (DB) stored with the plurality of moving images that include a plurality of exercise motions, the moving image by identifying a frame corresponding to the exercise motion of the person from among the plurality of frames included in the original moving image.

The electronic apparatus 100 may identify a person and pose data of the person from the plurality of frames in the moving image (S1220). For example, the electronic apparatus 100 may obtain pose data by inputting the moving image in a neural network model which can identify the pose data.

The electronic apparatus 100 may obtain exercise pattern information corresponding to the plurality of frames using the pose data of the identified person (S1230). For example, the electronic apparatus 100 may identify each of the specific body parts of the person included in the moving image as key points, and obtain the pose data by identifying the movement of the identified key points.

The electronic apparatus 100 may recognize the exercise motion of the identified person by inputting at least one frame of the moving image to at least one neural network model, and obtain exercise feature information corresponding to the recognized exercise motion (S1240).

The electronic apparatus 100 may identify, based on the exercise feature information and the exercise pattern information, the first frame interval and the second frame interval different from the first frame interval from among the plurality of frames in the moving image (S1250). For example, if the exercise motion of the person is a non-symmetrical motion and a non-hold motion, frames corresponding to the first symmetrical exercise motion and the second symmetrical exercise motion may be respectively identified from the plurality of frames in the moving image based on the exercise pattern information. A frame corresponding to the first symmetrical exercise motion of a second number of times and a frame corresponding to the second symmetrical exercise motion of a second number of times from the start frame from among the plurality of frames in the moving image may be identified as the first frame interval.

The electronic apparatus 100 may compare the first frame interval with the second frame interval and provide information on the exercise motion corresponding to the second frame (S1260). The information on the exercise motion may be information for guiding the exercise motion of the person in the second frame interval.

Functions associated with an artificial intelligence according to the disclosure may be operated through the processor 120 and the memory 110 of the electronic apparatus 100.

The processor 120 may be configured of one or a plurality of processors. The one or plurality of processors may be a generic-purpose processor such as a central processing unit (CPU) and an application processor (AP), a graphic dedicated processor such as a graphic processing unit (GPU) and a vision processing unit (VPU), or an artificial intelligence dedicated processor such as a neural processing unit (NPU) and a tensor processing unit (TPU).

According to an embodiment, if a plurality of processors is included in a system on chip (SoC) included in the electronic apparatus 100, the electronic apparatus 100 may use a graphic dedicated processor or an artificial intelligence dedicated processor from among the plurality of processors to perform computations associated with artificial intelligence (e.g., computations associated with learning or inference of an artificial intelligence model), and perform a typical computation of the electronic apparatus using a generic-purpose processor from among the plurality of processors. For example, the electronic apparatus 100 may use at least one from among the GPU, the VPU, the NPU, and the TPU which are specialized in convolution computation from among the plurality of processors to perform a computation associated with artificial intelligence, and use at least one from among the CPU and the AP from among the plurality of processors to perform a typical computation of the electronic apparatus 100.

In addition, the electronic apparatus 100 may use a multi-core (e.g., a dual-core, a quad-core, etc.) included in one processor to perform computation on a function associated with artificial intelligence. For example, the electronic apparatus may use the multi-core included in the processor to perform the convolution computation in parallel. The one or the plurality of processors may control so as to process input data according to a pre-defined operation rule or an artificial intelligence model stored in the memory. The pre-defined operation rule or the artificial intelligence model is characterized by being created through learning.

The being created through learning referred herein refers to the pre-defined operation rule of a desired feature or an artificial intelligence model being created by applying a learning algorithm to a plurality of learning data. The learning may be carried out in the machine itself in which the artificial intelligence according to the disclosure is performed, or carried out through a separate server and/or system.

The artificial intelligence model may be configured of a plurality of neural network layers. Each layer may have a plurality of weight values, and may perform processing of layers through a processing result of a previous layer and processing of the plurality of weight values. Examples of the neural network may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), and Deep-Q Networks, and the neural network of the disclosure is not limited to the above-described examples unless otherwise specified.

The learning algorithm may be a method for a predetermined target machine to make decisions or predictions on its own using a plurality of learning data to train the predetermined target machine (e.g., robot). Examples of the learning algorithm may include supervised learning, unsupervised learning, semi-supervised learning, or reinforcement learning, and the learning algorithm of the disclosure is not limited to the above-described examples unless otherwise specified.

The term "part" or "module" used in the disclosure may include a unit configured as a hardware, software, or firmware, or any combination thereof, and may be used interchangeably with terms such as, for example, and without limitation, logic, logic blocks, components, circuits, or the like. "Part" or "module" may be a component integrally formed or a minimum unit or a part of the component performing one or more functions. For example, a module may be configured as an application-specific integrated circuit (ASIC).

The various embodiments of the disclosure may be implemented with software including instructions stored in a machine-readable storage media (e.g., computer). The machine may call a stored instruction from the storage medium, and as a device operable according to the called instruction, may include an electronic apparatus 100 according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. The, 'non-transitory' storage medium is tangible and may not include a signal, and the term does not differentiate data being semi-permanently stored or being temporarily stored in the storage medium.

According to an embodiment, a method according to the various embodiments described in the disclosure may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be at least stored temporarily in a server of a manufacturer, a server of an application store, or a storage medium such as a memory of a relay server, or temporarily generated.

Each of the elements (e.g., a module or a program) according to various embodiments may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus, comprising:

memory storing one or more instructions; and at least one processor, comprising processing circuitry, coupled with the memory and configured to control the electronic apparatus, wherein the one or more instructions, when executed by the at least one processor, causes the electronic apparatus to:

obtain a moving image, identify a person and pose data of the person from a plurality of frames in the moving image, obtain exercise pattern information corresponding to the plurality of frames using pose data of the identified person, recognize an exercise motion of the identified person by inputting at least one frame of the moving image into at least one neural network model, and obtain exercise feature information corresponding to the recognized exercise motion, identify a first frame interval from among the plurality of frames in the moving image, the first frame interval having a length determined, based on the exercise feature information and the exercise pattern information, identify a second frame interval, different from the first frame interval, from among the plurality of frames in the moving image, the second frame interval having a specified length from a current frame, compare first exercise pattern information for the first frame interval and second exercise pattern information for the second frame interval, and provide information on an exercise motion corresponding to the second frame interval based on the comparing.

2. The electronic apparatus of claim 1, wherein the memory stores one or more instructions that, when executed by at least one processor comprising processing circuitry, cause the electronic apparatus to:

input at least one frame of the moving image into a first neural network model configured to identify whether an exercise motion of a person is a symmetrical motion, and identify whether the exercise motion of the person is a symmetrical motion, and input at least one frame of the moving image into a second neural network model configured to identify whether an exercise motion of a person is a hold motion, and identify whether the exercise motion of the person is a hold motion.

3. The electronic apparatus of claim 2, wherein:

the first neural network model is configured to be trained based on a learning moving image comprising an exercise motion of a person and information on whether the exercise motion of the person corresponding to the learning moving image is a symmetrical exercise motion, and the second neural network model is configured to be trained based on a learning moving image comprising an exercise motion of a person and information on whether the exercise motion of the person corresponding to the learning moving image is a hold motion.

4. The electronic apparatus of claim 1, wherein the memory stores one or more instructions that, when executed by at least one processor comprising processing circuitry, cause the electronic apparatus to:

identify, as the first frame interval, an interval from a start frame to a frame corresponding to a first time, based on an exercise motion of the person being a symmetrical motion and a hold motion.

5. The electronic apparatus of claim 1, wherein the memory stores one or more instructions that, when executed by at least one processor comprising processing circuitry, cause the electronic apparatus to:

identify, based on an exercise motion of the person being a symmetrical motion and a non-hold motion, each exercise repetition interval from the plurality of frames in the moving image based on the exercise pattern information, and identify, as the first frame interval, an interval from a start frame to a frame corresponding to an exercise repetition interval of a first number of times, based on the identified exercise repetition intervals.

6. The electronic apparatus of claim 1, wherein the memory stores one or more instructions that, when executed by at least one processor comprising processing circuitry, causes the electronic apparatus to:

identify, as the first frame interval, based on an exercise motion of the person being a non-symmetrical motion and a hold motion, an interval corresponding to an interval from a frame in which a first symmetrical exercise motion is first started to a first time and an interval from a frame in which a second symmetrical exercise motion is first started to a second time.

7. The electronic apparatus of claim 1, wherein the memory stores one or more instructions that, when executed by at least one processor comprising processing circuitry, cause the electronic apparatus to:

identify, based on an exercise motion of the person being a non-symmetrical motion and a non-hold motion, each frame corresponding to a first symmetrical exercise motion and a second symmetrical exercise motion from the plurality of frames in the moving image based on the exercise pattern information, and identify, as the first frame interval, a frame corresponding to the first symmetrical exercise motion of a first number of times and a frame corresponding to the second symmetrical exercise motion of a second number of times from a start frame.

8. The electronic apparatus of claim 1, wherein the memory stores one or more instructions that, when executed by at least one processor comprising processing circuitry, cause the electronic apparatus to:

identify a physically depleted state based on a difference value of exercise pattern information corresponding to the first frame interval and exercise pattern information of the second frame interval being greater than or equal to a specified value, and provide, based on identifying the physical depleted state, information on an exercise motion of the person corresponding to the second frame interval.

9. The electronic apparatus of claim 1, wherein the memory stores one or more instructions that, when executed by at least one processor comprising processing circuitry causes the electronic apparatus to:

obtain an original moving image, and obtain, based on an exercise database (DB) storing a plurality of moving images that comprise a plurality of exercise motions, the moving image by identifying a frame corresponding to an exercise motion of the person from among a plurality of frames comprising in the original moving image.

10. A method of controlling an electronic apparatus, the method comprising:

obtaining a moving image;

identifying a person and pose data of the person from a plurality of frames in the moving image;

obtaining exercise pattern information corresponding to the plurality of frames using pose data of the identified person;

recognizing an exercise motion of the identified person by inputting at least one frame of the moving image into at least one neural network model, and obtaining exercise feature information corresponding to the recognized exercise motion;

identifying a first frame interval from among the plurality of frames in the moving image, the first frame interval having a length determined, based on the exercise feature information and the exercise pattern information;

identifying a second frame interval, different from the first frame interval, from among the plurality of frames in the moving image, the second frame interval having a specified length from a current frame;

comparing first exercise pattern information for the first frame interval and second exercise pattern information for the second frame interval; and providing information on an exercise motion corresponding to the second frame interval based on the comparing.

11. The method of claim 10, further comprising:

inputting at least one frame of the moving image into a first neural network model to identify whether an exercise motion of a person is a symmetrical motion, and identifying whether an exercise motion of the person is a symmetrical motion, and inputting at least one frame of the moving image into a second neural network model to identify whether an exercise motion of a person is a hold motion, and identifying whether an exercise motion of the person is a hold motion.

12. The method of claim 11, wherein:

the first neural network model is configured to be trained based on a learning moving image comprising an exercise motion of a person and information on whether the exercise motion of the person corresponding to the learning moving image is a symmetrical motion, and the second neural network model is configured to be trained based on a learning moving image comprising an exercise motion of a person and information on whether the exercise motion of the person corresponding to the learning moving image is a hold motion.

13. The method of claim 10, further comprising:

identifying, as the first frame interval, an interval from a start frame to a frame corresponding to a first time, based on an exercise motion of the person being a symmetrical motion and a hold motion.

14. The method of claim 13, further comprising:

identifying, based on an exercise motion of the person being a non-symmetrical motion and a non-hold motion, each frame corresponding to a first symmetrical motion and a second symmetrical motion from the plurality of frames in the moving image based on the exercise pattern information, and identifying, as the first frame interval, a frame corresponding to the first symmetrical motion of a first number of times and a frame corresponding to the second symmetrical motion of a second number of times from a start frame.

15. The method of claim 10, further comprising:

identifying, based on an exercise motion of the person being a symmetrical exercise motion and a non-hold motion, each exercise repetition interval from the plurality of frames in the moving image based on exercise pattern information, and identifying, as the first frame interval, an interval from a start frame to a frame corresponding to an exercise repetition interval of a first number of times, based on the identified exercise repetition intervals.

16. The method of claim 10, further comprising:

identifying, as the first frame interval, based on an exercise motion of the person being a non-symmetrical motion and a hold motion, an interval corresponding to an interval from a frame in which a first symmetrical exercise motion is first started to a first time and an interval from a frame in which a second symmetrical exercise motion is first started to a second time.

17. The method of claim 10, further comprising:

identifying a physically depleted state based on a difference value of exercise pattern information corresponding to the first frame interval and exercise pattern information of the second frame interval being greater than or equal to a specified value, and providing, based on identifying the physical depleted state, information on an exercise motion of the person corresponding to the second frame interval.

18. A non-transitory computer readable recording medium having recorded thereon a program that, when executed by at least one processor, causes an electronic apparatus to perform operations comprising:

obtaining a moving image;

identifying a person and pose data of the person from a plurality of frames in the moving image;

obtaining exercise pattern information corresponding to the plurality of frames using pose data of the identified person;

recognizing an exercise motion of the identified person by inputting at least one frame of the moving image into at least one neural network model, and obtaining exercise feature information corresponding to the recognized exercise motion;

identifying a first frame interval from among the plurality of frames in the moving image, the first frame interval having a length determined, based on the exercise feature information and the exercise pattern information;

identifying a second frame interval, different from the first frame interval, from among the plurality of frames in the moving image, the second frame interval having a specified length from a current frame;

compare first exercise pattern information for the first frame interval and second exercise pattern information for the second frame interval; and providing information on an exercise motion corresponding to the second frame interval based on the comparing.

\* \* \* \* \*